United States Patent [19]
Blank

[11] 3,709,624
[45] Jan. 9, 1973

[54] TORROIDAL BORING HEAD
[76] Inventor: Elmer D. Blank, 307 Parkwood Drive, Glendale, Calif. 91202
[22] Filed: Dec. 7, 1970
[21] Appl. No.: 95,868

Related U.S. Application Data

[63] Continuation of Ser. No. 782,818, Dec. 11, 1968, abandoned.

[52] U.S. Cl. ..........................408/127, 90/20, 408/71
[51] Int. Cl. ..............................................B23b 29/03
[58] Field of Search..........408/62, 63, 69, 59, 57, 71, 408/125, 127; 82/1.4, 1.5; 90/18, 20

[56] References Cited

UNITED STATES PATENTS

| 550,783 | 12/1895 | Elliott et al. | 408/127 |
| 1,403,241 | 1/1922 | Halverson | 408/57 |
| 1,913,490 | 6/1933 | Kepler | 408/19 |
| 3,388,505 | 6/1968 | Dreiling | 51/134.5 |
| 3,146,646 | 9/1964 | Mucklenbeck et al. | 82/14 |

FOREIGN PATENTS OR APPLICATIONS

| 439,016 | 6/1912 | France | 408/1 |
| 17,957 | 1915 | Great Britain | 408/1 |

OTHER PUBLICATIONS

Publication: American Machinist; Sept. 14, 1953; pp. 139

Primary Examiner—Gerald A. Dost
Attorney—Elwood S. Kendrick, Thomas H. Jones and Kendrick and Subkow

[57] ABSTRACT

A machine for accurately machining curved holes comprising a rotatable work supporting table having an axis of rotation and a plane of rotation; a segmented torroidal casing having two ends and support means fixedly mounting said casing in a plane parallel to said plane of rotation with the axis of said torroidal casing coinciding with said axis of rotation; a cutting tool rotatably mounted at an end of said casing and having a diameter larger than the diameter of said casing; drive means within said casing operatively connected to said cutting tool, and means to rotate said table about said axis of rotation.

A tool for accurately machining a curved hole comprising a segmented torroidal casing having two ends; a cutting tool having a diameter larger than that of said casing, said cutter rotatably mounted at one of said ends; a drive shaft rotatably mounted at the other of said ends; and a gear train mounted within said casing and operatively connecting said drive shaft to said cutting tool.

10 Claims, 3 Drawing Figures

INVENTOR
ELMER D. BLANK
BY KENDRICK and SUBKOW
ATTORNEYS

INVENTOR
ELMER D. BLANK
BY KENDRICK and SUBKOW
ATTORNEYS

TORROIDAL BORING HEAD

This application is a continuation of Ser. No. 782,818, filed Dec. 11, 1968, and now abandoned.

This invention pertains to a machine and to a tool for use therewith in accurately machining a curved hole.

A variety of machine tools are known and used for machining holes in metal. To cite but a few, there are milling machines, drill presses, and turret lathes. In these various machines, there is a straight line movement of the tool into the work being machined, while at the same time there is relative rotational movement between the tool and the work. The straight line movement of the tool into the work, which is a common characteristic of machines now in use, produces a straight hole, i.e., a cylindrical hole having straight sides.

Of the various machine tools now in use, none is capable of accurately machining a curved hole. By a curved hole, I refer to a hole having the configuration of a torus which is a surface generated by the revolution of a circle about an axis in its plane other than its diameter, i.e., the axis of the torus or the torroidal axis.

In various structures, such as in missiles or aircraft, the overall design requirements of the system may fix rigid design parameters on both the size and weight of individual elements. When the weight or size requirements of a particular element present design problems, it may be advantageous in many instances to save weight and space by using a design configuration in which the element contains an accurately machined curved hole. Such a design would be completely impractical with previously available machine tools because of their inability to machine such a hole.

In accord with the present invention, I have provided a machine and a tool for use therewith which are capable of accurately machining a curved hole having the configuration of a torus. In accomplishing this result, my novel machine employs a rotatable table which supports the work and which rotates in a plane about an axis of rotation. A segmented torroidal casing having two ends is fixedly mounted in a plane which is parallel to the plane of rotation of the table with the axis of the torroidal casing coinciding with the axis of rotation of the table. A rotatable cutting tool having a diameter larger than the diameter of the torroidal casing is mounted at one end of the casing and is driven by a drive means contained within the casing. During the cutting operation, the table, having the work mounted thereon, is rotated to bring the work into contact with the rotating cutting tool. As the cutting tool removes material from the work, the work is rotated into the cutting tool such that the cutting tool accurately machines a torroidal hole within the work. During the cutting operation, the torroidal hole machined by the cutter encloses the torroidal casing which has a smaller diameter than that of the torroidal hole.

My novel tool, as described above with regard to my machine, comprises a torroidal casing having a cutting tool mounted at one end thereof, and having drive means contained within the interior of the casing for rotation of the cutting tool.

A specific embodiment of the invention is illustrated in the accompanying drawings, in which like reference characters designate like parts in the several views thereof, wherein.

Figure 1:
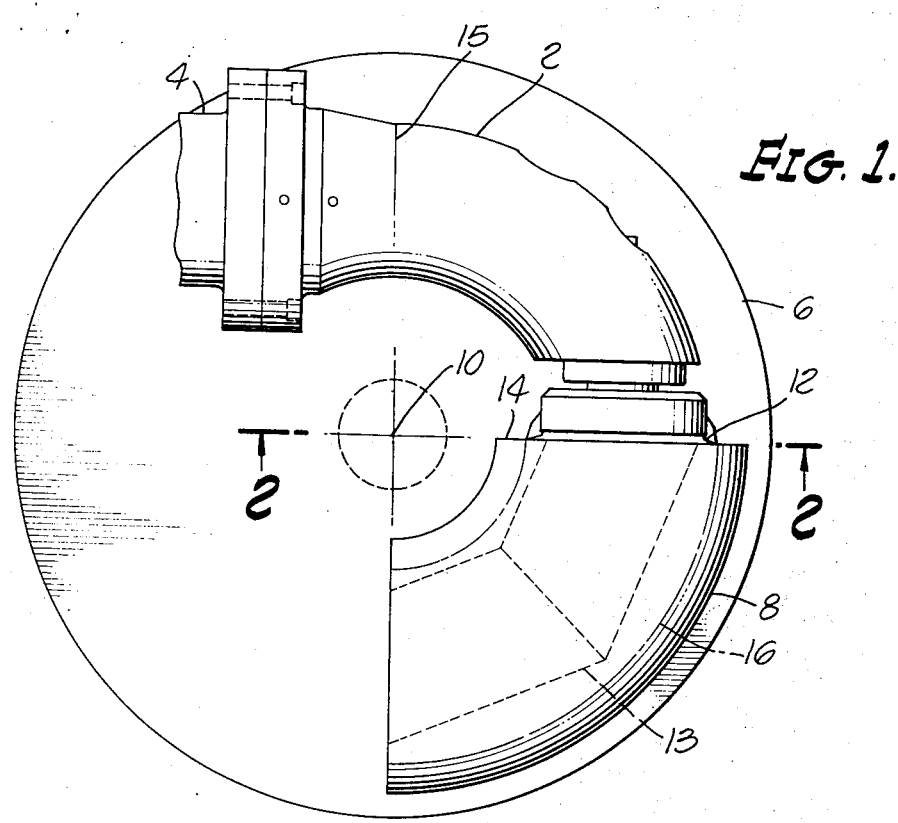
FIG. 1 is a plan view of my machine showing the relation of the torroidal casing and cutter with respect to the work mounted on the rotatable table.

FIG. 1 illustrates the overall configuration of my machine. A segmented torroidal casing 2 subtending an angle of about 90° is mounted on a power supply takeoff 4, which, for example, may be the output from a vertical milling machine. A rotatable table 6 is mounted below the torroidal casing with the plane of rotation of table 6 being parallel to the plane of the torroidal casing 2. The work 8 is fixedly mounted on table 6 and the axis of rotation 10 of table 6 coincides with the axis of the torroidal casing 2.

A rotatable cutting tool 12 is mounted at one end of torroidal casing 2, the tool 12 having a diameter larger than that of the torroidal casing. In order to save valuable machining time, it may frequently be desirable to drill out the center portion of the work 8 in approximately the manner shown in phantom line drawing at 13. This can easily be accomplished by a conventional drill. During the cutting operation, the tool 12 machines a torroidal hole shown in phantom line drawing 16, while the surface 14 of the work advances to approximately the point shown at line 15 on the torroidal casing 2.

Figure 3:
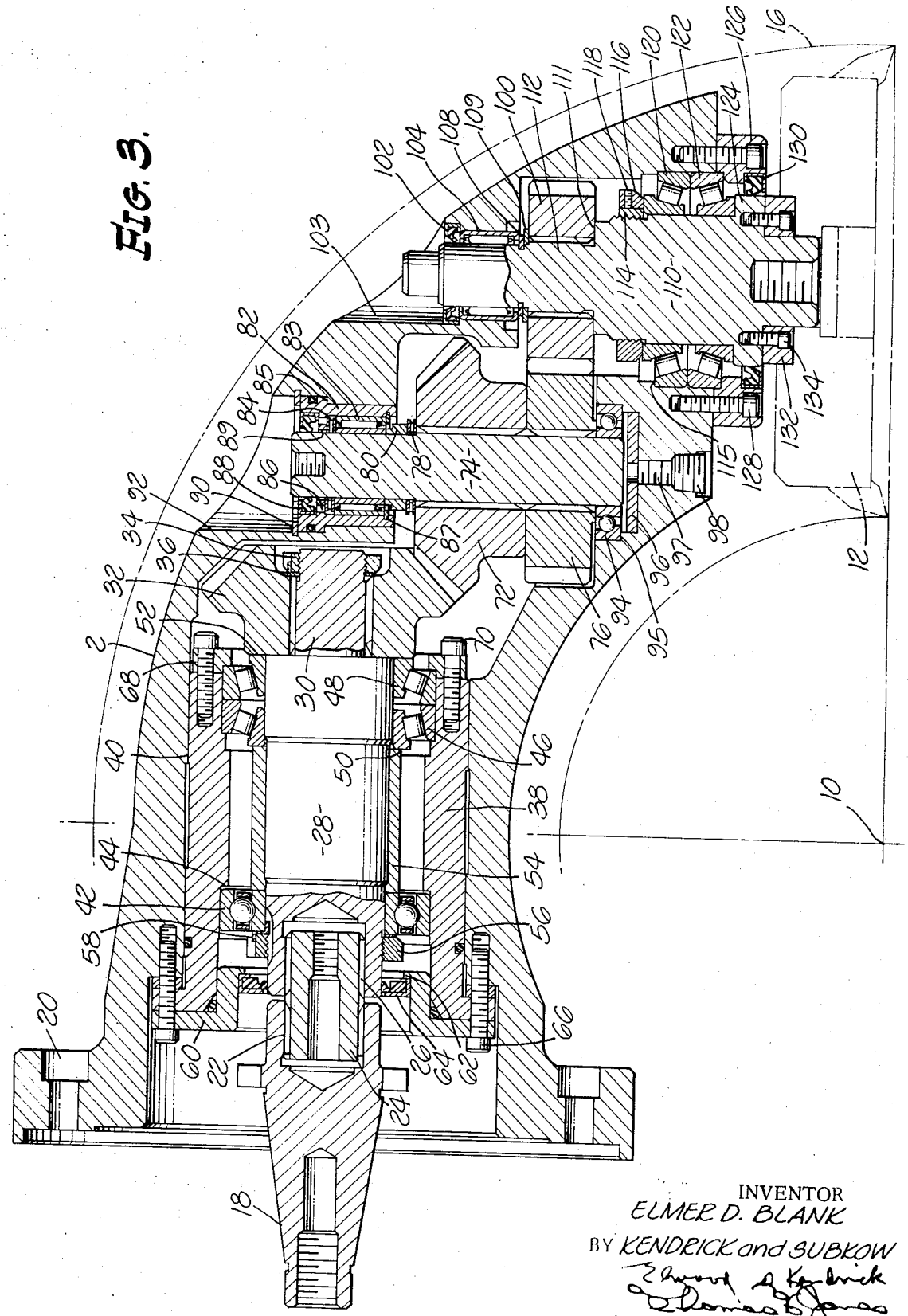
FIG. 3 is a top sectional view of my torroidal boring head taken along the line 3—3 of FIG. 2.

The details of my torroidal boring head are shown in cross-sectional view in FIG. 3. As shown, a drive shaft 18 is connected through a gear train within the interior of torroidal casing 2 to the cutting tool 12 which is rotatably mounted at the other end of the torroidal casing. The torroidal casing 2 may be mounted on a power supply takeoff, as shown at 4 in FIG. 1, by means of bolts which pass through holes 20. The inner end of drive shaft 18 terminates at an internally splined socket 22 which receives an externally splined drive connector 24. Drive connector 24 in turn engages an internally splined socket 26 of drive shaft 28. The inner end of drive shaft 28 terminates at an externally splined protrusion 30 on which is mounted an internally splined spiral bevel gear 32. Bevel gear 32 is held on the externally splined protrusion 30 by means of a washer 36 and a nut 34 which threadedly engages the end of protrusion 30.

The drive shaft 28 is rotatably supported within torroidal casing 2 by means of tapered roller bearings 46 and 48 and a ball bearing 42. A sleeve 54 surrounds the shaft 28 and holds the inner races of ball bearing 42 and roller bearing 46 in a spaced-apart relationship. A support sleeve 38 is mounted within a cylindrical recess 40 of torroidal casing 2 and supports the outer races of ball bearing 42 and roller bearings 46 and 48.

The support sleeve 38 has a shoulder 44 which engages the inner surface of the outer race of ball bearing 42 and a shoulder 50 which bears against the outer surface of the outer race of roller bearing 46, thereby holding the outer races of ball bearing 42 and roller bearing 46 in a spaced-apart relation. The outer surface of the inner race of ball bearing 42 is held relative to shaft 28 by a stop nut 56. Stop nut 56 threadedly engages shaft 28 and bears against a gasket 58 positioned between the stop nut 56 and the inner race of ball bearing 42.

An annular seal plate 60 fixedly engages the outer surface of support sleeve 38 and both seal plate 60 and support sleeve 38 are connected to torroidal casing 2 by screws 66, which are in threaded engagement with holes in casing 2. The annular seal plate 60 terminates at an inner lip 62 which abuts a spring mounted wiper seal 64 in sliding contact with shaft 28.

The inner surface of the inner race of roller bearing 48 engages the inner surface 52 of gear 32 while the inner surface of the outer race of roller bearing 48 is held by a retaining ring 68 which is connected to support sleeve 38 by a plurality of screws 70 in threaded engagement with holes in sleeve 38. As illustrated, the shaft 28, gear 32, bearings 42, 46 and 48, and the sleeves 38 and 54, are designed such that they can be assembled into a unit which is then inserted into the cylindrical recess 40 of casing 2 and held in place by the seal plate 60 and screws 66.

The teeth of gear 32 mesh with the teeth of an internally splined spiral bevel gear 72 which is mounted on an externally splined first driven shaft 74 positioned at about a 90° angle with respect to drive shaft 28. An internally splined helical gear 76 is spline-connected to shaft 74 and is driven by rotation of shaft 74 through gear 72. A needle thrust bearing 78 surrounds shaft 74 and contacts the surface of gear 72. Positioned against a thrust plate of needle bearing 78 is a spacer sleeve 80 which bears against the inner race of a needle bearing 83. Needle bearing 83 is supported by a sleeve 82 positioned within hole 92 in torroidal casing 2 and bearing against a shoulder 85 within hole 92.

A snap ring 87 mounted in sleeve 82 supports the outer race of bearing 83. Mounted within sleeve 82 is a needle thrust bearing 84 which bears against the end surfaces of the races of needle bearing 83. An inwardly extending shoulder 89 of sleeve 82 contacts the outer thrust plate of needle bearing 84. A spring mounted wiper seal 88 is positioned outwardly of shoulder 89 within sleeve 82 while a snap ring 90 holds sleeve 82 in place within hole 92. A plurality of holes 86 in shoulder 89 permit the flow of lubricant to wiper seal 88.

An angular contact ball bearing 94 resting on a shoulder 95 rotatably supports one end of shaft 74. A washer 96 is positioned outwardly of bearing 94 adjacent a threaded hole 97 containing a threaded plug 98. During assembly, gears 72 and 76 are inserted into the body cavity of torroidal casing 2 through the end opening which accommodates drive shaft 18 as shown in FIG. 3. After gears 72 and 76 have been inserted and aligned on top of the ball bearing 94, the shaft 74 having bearings 78, 83 and 84 mounted thereon together with spacers 80 and 86 and sleeve 82 are inserted as a unit through opening 92.

Washer 96 is used in removing bearing 94 as, for example, during repair of the Apparatus. A threaded bolt (not shown) may be inserted into a hole 97 where it encounters the outer surface of washer 96 and forces washer 96 against bearing 94, thereby removing it from the recess in which it is contained.

Gear 76 meshes with a mating helical gear 100 which is internally splined and engages an externally splined portion 112 of a second driven, and shaft 110 which is positioned approximately parallel to said first driven shaft 74. Gear 100 rests on a shoulder 111 and is secured thereto by a retaining ring 108 which engages a washer 109. Shaft 110 is rotatably supported by a pair of oppositely positioned tapered roller bearings 120 and 122, the inner races of which are fixedly held against a shoulder 124 by a lock nut 116 which threadedly engages shaft 110. Lock nut 116 has an inner axial groove within which is contained a deformable wedging block 114. The block 114 can, for example, be made of a deformable material such as brass or bronze, and it is locked in place by a set screw 118.

The outer races of tapered roller bearings 120 and 122 are held between a shoulder 115 and an annular end plate 126 which is connected to torroidal casing 2 by a plurality of screws 128. A spring mounted wiper seal 130 is supported by plate 126 and flexibly engages rotatable shaft 110. A tool support ring 132 is connected by screws 134 to the forward end of shaft 110 to provide a bearing surface for the cutting tool 12.

A roller bearing 104 fitted within hole 103 in torroidal casing 2 rotatably supports the other end of shaft 110. Positioned outwardly of roller bearing 104 is a spring supported wiper seal 102 which flexibly engages shaft 110.

The cutting surface 16 generated by the cutting tool 12 on its contact with the work is illustrated in FIG. 1. As shown in FIG. 3, the cutting surface 16 is larger than the diameter of the torroidal casing 2 such that the cutting surface 16 surrounds the torroidal casing 2.

Figure 2:
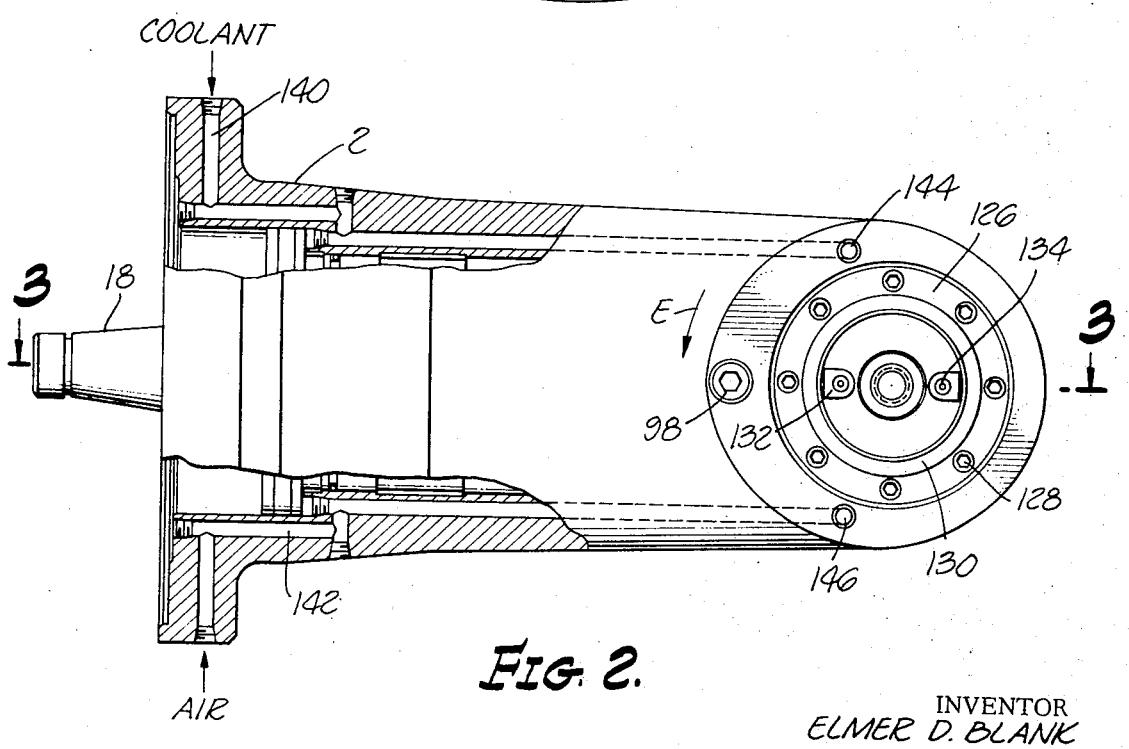
FIG. 2 is a front view of my torroidal boring head in partial section taken along the line 2—2 of FIG. 1.

Turning to FIG. 2, the torroidal casing 2 contains a coolant passage 140 and an air passage 142 which terminate respectively in a coolant opening 144 and an air opening 146, both of which are in close proximity to the cutting tool 12 (not shown in FIG. 2). On rotation of cutting tool 12 the chips are discharged into the space between the cutting surface 16 and the outer surface of torroidal casing 2. As illustrated in FIG. 2, the cutting tool is mounted slightly off center with respect to the outer face of torroidal casing 2 such that the center of tool 12 falls on the approximate center of the torroidal casing 2 if it were extended to the cutting face of tool 12.

As illustrated by the foregoing description, the machine and tool of my invention provide a means for accurately machining curved holes in which the diameter of the hole is relatively large in relation to the radius of curvature of the hole, i.e., the torroidal radius. Holes which may be accurately machined in accord with my invention may have, for example, a ratio of torroidal radius to hole diameter, i.e., the approximate diameter of the cutting tool, ranging from about 1/1 to about 2/1.

In order to machine curved holes which have a relatively large diameter in relation to the radius of curvature of the hole, it is necessary that the drive means for the cutting tool be relatively stiff and capable of transmitting high torque. In providing such a drive, it will be noted that opposed roller bearings 46 and 48 take up axial thrust in either direction on the shaft 28. Similarly, opposed roller bearings 120 and 122 take up axial thrust on shaft 110.

The gearing employed in the preferred embodiment of my invention is designed to carry heavy loads and also to minimize axial thrust exerted on shaft 110 by cutting tool 12. The shaft 110 is driven in a counterclockwise rotation, as shown at E in FIG. 2, by a left handed helical gear 100 which imparts an axial thrust to shaft 110 in the direction of tool 12. This axial thrust acts to minimize the affect of any opposite axial thrust imparted to shaft 110 by contact of tool 12 with the work.

Shaft 74 is driven in a clockwise rotation (opposite to E as shown in FIG. 2) and drives a right handed helical gear 76 which imparts axial thrust to shaft 110 through helical gear 100. Similarly, spiral bevel gear 72 has a right handed helix while gear 52 has a left handed helix and is driven in a counterclockwise rotation by shaft 28. In this manner, the outer thrust imparted to shaft 110 in the direction of tool 12 and any counter thrust received by shaft 110 on contact of tool 12 with the work is transmitted through or absorbed by the entire drive train.

The bearing 94 supporting one end of shaft 74 is an angular contact ball bearing which is capable of absorbing axial thrust from shaft 74. Thrust bearing 84 also absorbs axial thrust of shaft 74 while bearing 78 absorbs axial thrust imparted by gear 72.

As illustrated in FIG. 3, it should be understood that the interior of the segmented torroidal casing 2 contains a lubricant for the elements of the drive means. The various seals 102, 130, 88, and 64 effectively seal the casing against leakage of the lubricant.

Having fully defined a preferred embodiment of my invention in the foregoing specification and drawings, I desire to be limited only by the lawful scope of the appended claims.

I claim:

1. A machine for accurately machining curved holes in a workpiece comprising, in combination:
   a rotatable table for supporting the workpiece having an axis of rotation and a plane of rotation;
   a segmented toroidal casing subtending an angle of about 90° having two ends and support means fixedly mounting said casing for maintaining said casing in a plane spaced from and parallel to said plane of rotation with the axis of said toroidal casing coinciding with said axis of rotation;
   a cutting tool rotatably mounted at an end of said casing and having a diameter larger than the diameter of said casing;
   non-flexible drive means within said casing operatively connected to said cutting tool, said drive means including a drive shaft, a first driven shaft positioned at about a 90° angle with respect to said drive shaft, a second driven shaft positioned about parallel to said first driven shaft, gear means interconnecting said drive shaft with said first driven shaft and gear means interconnecting said first driven shaft with said second driven shaft, said second driven shaft being directly connected to said cutting tool; and means to rotate said table about said axis of rotation for moving said workpiece against said cutting tool along a curved path coinciding with the toroidal shape of said casing.

2. A machine for accurately machining curved holes comprising:
   a rotatable work-supporting table having an axis of rotation and a plane of rotation;
   a curved casing having two ends, and support means fixedly mounting said casing in a plane parallel to said plane of rotation with the axis of curvature of said casing coinciding with said axis of rotation;
   a cutting tool rotatably mounted at an end of said casing and having a diameter larger than the outer dimension of said casing;
   drive means within said casing operatively connected to said cutting tool and comprising a gear train including a rotatable shaft supporting said cutting tool, said shaft being driven by a helical gear which imparts an axial thrust to said shaft in the direction of said tool, and means to rotate said table about said axis of rotation.

3. The machine of claim 2 including a coolant passage and an air passage in said casing, each of said passages having discharge openings adjacent said cutting tool.

4. The machine of claim 2 wherein the ratio of the radius of said toroidal casing to the cutting diameter of said tool ranges from about 1/1 to about 2/1.

5. A tool for accurately machining a curved hole comprising:
   a segmented toroidal casing subtending an angle of about 90° and having two ends;
   a cutting tool having a diameter larger than the diameter of said casing, said cutting tool rotatably mounted at one of said ends;
   non-flexible drive means within said casing operatively connected to said cutting tool including a drive shaft rotatably mounted at the other of said ends, a first driven shaft positioned at about a 90° angle with respect to said drive shaft, a second driven shaft positioned about parallel to said first driven shaft, gear means interconnecting said drive shaft with said first driven shaft and gear means interconnecting said first driven shaft with said second driven shaft.

6. The tool of claim 5 wherein the ratio of the radius of said toroidal casing to the cutting diameter of said tool ranges from about 1/1 to about 2/1.

7. The tool of claim 5 including a coolant passage and an air passage in said casing, each of said passages having discharge openings adjacent said cutting tool.

8. The machine of claim 2 wherein said casing has the configuration of a torus.

9. A tool for accurately machining a curved hole comprising:
   a curved casing having two ends;
   a cutting tool having a diameter larger than the outer dimension of said casing, said cutting tool rotatably mounted at one of said ends;
   a drive shaft rotatably mounted at the other of said ends;
   a gear train mounted within said casing and operatively connecting said drive shaft to said cutting tool, said gear train including a shaft on which said cutting tool is mounted, and a helical gear driving said shaft which imparts an axial thrust to said shaft in the direction of said tool.

10. The tool of claim 9 wherein said casing has the configuration of a torus.

* * * * *

UNITED STATES PATENT OFFICE
CERTIFICATE OF CORRECTION

Patent No. 3,709,624            Dated   January 9, 1973

Inventor(s)  TOROIDAL BORING HEAD

It is certified that error appears in the above-identified patent and that said Letters Patent are hereby corrected as shown below:

Correct the spelling of the word "torroidal" to --toroidal-- at the following places:

In the title;

Page 1, lines 6, 8 and 15;

Page 2, line 13;

Page 3, lines 3, 5, 8, 15, 16, 17, 18 and 20;

Page 4, lines 2, 4, 7, 10, 13, 15, 17, 19, 20, 25 and 28;

Page 5, lines 1, 4, 5, 6, 19 and 24;

Page 6, line 10;

Page 7, lines 7 and 24;

Page 8, line 22;

Page 9, lines 1, 8, 9, 11, 18, 20, 21, 27 and 29;

Page 11, line 10.

Signed and sealed this 27th day of November 1973.

(SEAL)
Attest:

EDWARD M. FLETCHER, JR.       RENE D. TEGTMEYER
Attesting Officer      Acting Commissioner of Patents